United States Patent

[11] 3,624,725

| [72] | Inventors | Tatsuo Kobayashi<br>Osaka;<br>Hiroshi Ueda, Nara, both of Japan |
|---|---|---|
| [21] | Appl. No. | 790,001 |
| [22] | Filed | Dec. 9, 1969 |
| [45] | Patented | Nov. 30, 1971 |
| [73] | Assignee | Minolta Camera Kabushiki Kaisha<br>Osaka, Japan |
| [32] | Priority | Dec. 9, 1968 |
| [33] | | Japan |
| [31] | | 43/683 |

[54] CAMERA HAVING A MECHANISM FOR AUTOMATICALLY CHANGING FROM AN AUTOMATIC PROGRAMMING EXPOSURE RANGE TO A FLASH AUTOMATIC EXPOSURE RANGE
3 Claims, 7 Drawing Figs.

| [52] | U.S. Cl. | 95/10 C,<br>95/64 A, 95/64 C |
|---|---|---|
| [51] | Int. Cl. | G03b 7/14,<br>G03b 7/16 |
| [50] | Field of Search | 95/10 C, 64<br>A, 64 C |

[56] References Cited
UNITED STATES PATENTS

| 3,075,441 | 4/1963 | Maitani | 95/10 C |
| 3,127,824 | 4/1964 | Williams | 95/10 C |
| 3,250,193 | 5/1966 | Horton | 95/64 |
| 3,406,620 | 10/1968 | Hochreiter et al. | 95/10 C |
| 3,464,333 | 9/1969 | Aoki et al. | 95/64 |
| 3,498,192 | 3/1970 | Ito et al. | 95/10 C |
| 3,529,524 | 9/1970 | Ueda | 95/64 A |

*Primary Examiner*—Joseph F. Peters, Jr.
*Attorney*—Watson, Cole, Grindle & Watson ABSTRACT: In an automatic exposure camera for changing from the minimum diameter of the camera diaphragm and the highest speed of the shutter to the maximum diameter of the diaphragm and the lowest speed of the shutter, namely, from the minimum exposure quantity to the maximum exposure quantity, in accordance with the indicator position of an exposure meter, a control stroke is provided for changing the shutter speed from the highest speed to the lowest speed of the shutter which is appropriate for the flash photographing while maintaining the diaphragm diameter constant, in accordance with the indicator position, and a control stroke for changing the diaphragm from the minimum diameter to the maximum diameter while maintaining shutter speed constant, and when the indicator position turns the shutter speed to the lowest speed and is in a location where the diaphragm takes the maximum diameter, the camera is changed over automatically to the automatic flash photographing and controls the diaphragm diameter in accordance with the photographic distance, while keeping the shutter speed in the lowest.

INVENTORS,
TATSUO KOBAYASHI
HIROSHI UEDA

BY Watson, Cole, Grindle & Watson
ATTORNEYS

INVENTORS,
TATSUO KOBAYASHI
HIROSHI UEDA

BY Watson, Cole, Grindle & Watson
ATTORNEYS

CAMERA HAVING A MECHANISM FOR AUTOMATICALLY CHANGING FROM AN AUTOMATIC PROGRAMMING EXPOSURE RANGE TO A FLASH AUTOMATIC EXPOSURE RANGE

BACKGROUND OF THE INVENTION

With the conventional camera having programming and flash automatic exposures, the programming for the synchronized change of the shutter exposure time and the stop at the time of the exposure adjustment within the automatic programming exposure range, and the switching over from the automatic programming exposure range to the flash automatic exposure range all require complicated adjustments since the pull of the springs for the parts for these adjustments is on the shutter release lever thereby making the operation of the shutter lever heavy and producing camera instability at the time of photographing. Thus with the conventional camera of this type the adjustments of the parts have been difficult in the process of construction and camera instability at the time of photographing has been difficult to avoid.

SUMMARY OF THE INVENTION

One object of the present invention is to eliminate the drawbacks mentioned above in a camera which is changeable automatically to the automatic programming exposure range and the flash automatically range, and to provide a camera which in the automatic programming range controls the exposure by adjusting either the exposure time or the diaphragm, and after said adjustment is completed, controls the exposure by adjusting the other.

Another object of the present invention is to provide a camera which, when the brightness of an object is in the high-brightness side, programs so as to change only the diaphragm thereby keeping the exposure time in the highest speed exposure time and, when the brightness of an object becomes lower than that mentioned above, programs so as to change the exposure time to the long time side by turning the diaphragm to the full opening state and, when the brightness of an object becomes further lower than mentioned above, changes over the camera automatically to the flash automatic exposure range keeping the exposure time in an exposure time suitable for the flash photograph.

The other objects of the present invention will become clear from the description of an embodiment disclosed hereinafter.

In order to attain the aforementioned objects of the present invention, when the ammeter pointer connected in series to the light-receiving element and impressed with the photocurrent is in the flash automatic exposure range, the pointer restraining member and the pointer detection member for displacing without engaging with said pointer at the initial stroke of the shutter release operation engage with said pointer in the automatic programming range of said ammeter pointer, and the displacement quantity of both members undergoes a change in accordance with the pointer position to control the exposure time and the diaphragm value and at the same time both said members are provided with, respectively in accordance with the pointer position, the even engage face which displacement quantity is invariable and the stepped variable engage face which displacement quantity is variable. And, when the even engage face of one of both members engages with the pointer at the appropriate position, and when the variable engage face of one of said both members engages with the pointer the even engage face of the other member engages with the pointer at said pointer position.

DESCRIPTION OF THE PREFERRED EMBODIMENT

Figure 1:
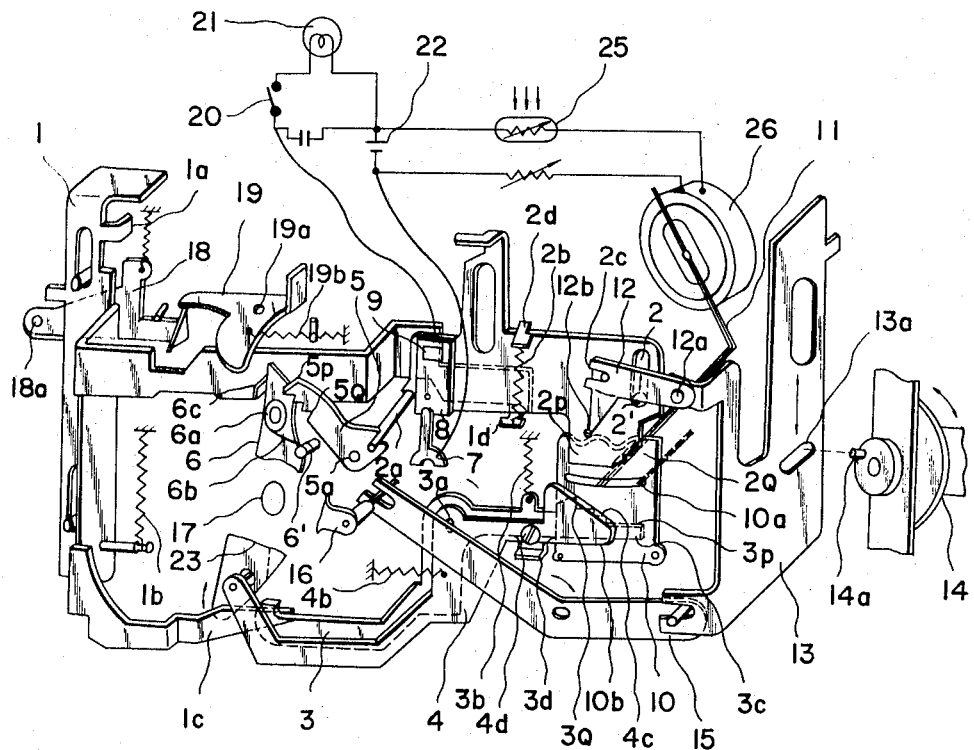
FIG. 1 is the perspective view which shows the essential parts of a preferred embodiment of the present invention.

The construction of the preferred embodiment of the present invention may be described with reference to FIG. 1 wherein the shutter release lever 1 is shown supported by a conventional pin and guiding groove in such a way as to permit the release lever to slide up and down, and is given an upward-moving bias by the spring 1b. A spring 2b is disposed between the projection 1d on the arm of the shutter release lever 1 and the projection 2d on the indicator clamping member 2 which is supported by a guiding groove and pin in such a way as to be able to slide up and down. The indicator clamping member 2 has an indicator stopping part which moves up and down along an indicator supporter 10 which has a groove 10a into which is inserted the end of indicator 11 of exposure meter 26. The indicator clamping member is so positioned that during its downward movement it covers groove 10a except for its right corner and, when the indicator 11 does not lie in the right corner of the groove 10a, the indicator clamping member comes in contact with and stops the indicator 11 and is stopped in turn in the position of such contact. On the right side of the indicator clamping member is formed a variable indicator stopping part 2Q which is step shaped (or on a slant) so that the indicator clamping member stops in various vertical positions according to the position of the indicator a constant indicator stopping part 2P (on the left side of the indicator stopping part) is evenly shaped so that the vertical position at which the indicator clamping member stops is not altered by means of such constant indicator stopping part 2P. Pin 2a which projects from the indicator clamping member 2 is engaged with an exposure time adjustment piece 5 which is pivoted by an axle 5a and which is provided with an exposure time adjusting tip 5P and a step shaped variable exposure time adjusting part 5Q. Also, pin 2C is provided on the indicator clamping member 2 which pin is engaged with a flash photographing adjusting lever 12 to be described hereinafter. Also provided on the indicator clamping member 2 is an insulating piece 8 having a contact 9 which, as the indicator clamping member 2 proceeds downwardly to such a degree without as to not contact indicator 11 at the right corner of groove 10a, contact 9 comes in contact with contact piece 7, thereby closing the flash circuit consisting of electricity source 22, flash bulb 21 and synchro-contacts 20.

Source 22 constitutes, in parallel with the circuit including contact piece 7 and contact 9, an exposure meter circuit which includes photoelectric element 25 and meter 26.

An indicator searching lever 3 is engaged with lower arm 1c of shutter release lever 1, lever 3 being pivotally mounted on axle 3a and being given a counterclockwise rotatability by means of spring 3b. Searching part 3c on the other end of lever 3 faces groove 10a. On the end of searching part 3c is formed an even constant adjusting part 3P and a stepped variable adjusting part 3Q. Engaged with a projection 3d on indicator searching lever 3 is a pin 4d of stop adjusting lever 4 which is pivotally mounted by means of axle 3a and is given a clockwise rotatability by means of spring 4b. One end of lever 4 is engaged with a stop diaphragm 23. On the other end of lever 4 a flash stop adjusting cam 4c is provided. A distance cooperation plate 13, onto which a flash photographing adjusting lever 12 is pivoted as at 12a and into groove 13a of which a pin 14a of a distance adjusting knob 14 is fitted, moves up and down in accordance with rotation of knob 14 thereby serving to adjust the focus of lens 17 through levers 15 and 16.

The projection 1a of shutter release lever 1 comes in contact with and pushes down shutter lock lever 18 towards the end of the downward movement of release lever 1. Lever 18 is engaged with a shutter driving lever 19 which is pivotally mounted by means of axle 19a and is given a counterclockwise rotatability by means of spring 19b. Lever 19 rotates when it is disengaged and in its rotation strikes and kicks a projection 6c of shutter sector 6 which is pivotally mounted by means of axle 6a and is given a counterclockwise return rotatability by means of spring 6b.

The head of shutter sector 6, on the other hand, strikes and is kicked by either the exposure time adjusting tip 5P or the stepped variable exposure time adjusting part 5Q of the exposure time adjusting piece 5 or, according to the rotational position of the exposure adjusting piece 5, it rotates without touching the piece 5 at all and strikes and is kicked by a fixed pin 6' and, according to the position to which it is kicked, the exposure time during which the photographing lens is revealed changes.

Figure 3:
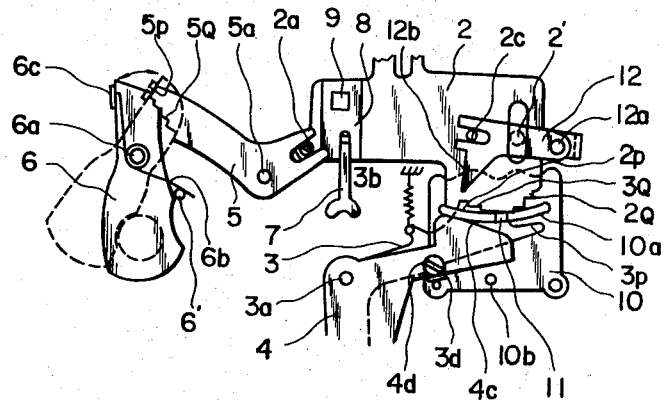
FIG. 3 is a front view which shows the positional relationship when the exposure meter indicator lies in the high-brightness side within the automatic programming exposure range of the said preferred embodiment.

The indicator 11, by reason of the above-described construction and within the automatic programming exposure range and when the subject is comparatively light, lies towards the left of groove 10a of indicator supporter 10 as seen in FIG. 3. Also shown is the constant indicator stopping part 2P which touches and stops and is stopped by indicator 11 as shutter release lever 1 is pushed down and indicator clamping member 2 is let down by spring 2b. Then the rotation angle of exposure time adjusting piece 5 is very small and the exposure time adjusting tip 5P lies in an interfering relationship with respect to the clockwise rotational course of the head of shutter sector 6, so that the two will strike one another whereby the shutter is set at the shortest exposure time. That is to say, as long as indicator 11 stays within the range of constant adjusting part 2P of indicator clamping member 2, the shutter remains at the shortest exposure time.

Figure 2:
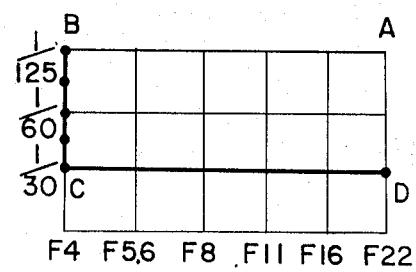
FIG. 2 is a diagram which shows the changes of the stop and the exposure time within the programming and flash automatic ranges of the said preferred embodiment and the switching relationship of the two ranges.

When shutter release lever 1 is pushed down further, indicator searching member 3 becomes engaged with lower arm 1c and is rotated by spring 3b in a counterclockwise direction while the stepped variable adjusting part 3Q of member 3 searches and touches and is stopped by indicator 11 which is being stopped by the constant adjusting part 2P of the indicator clamping member 2. Then the stop adjusting piece 4 which is engaged with and follows projection 3d also stops, thereby controlling the aperture degree of diaphragm 23. Therefore the aperture degree of the diaphragm takes the programmed line A–B (from F 22 to F 4) as is shown in FIG. 2, as indicator 11 moves from the left corner of groove 10a toward the right and the stop is changed from the smallest to the full width.

Within the automatic programming exposure range, when the subject becomes still darker and the proper exposure is not achieved at the shortest exposure time even though the stop is opened to full width, indicator 11 moves further toward the right. The variable stopping part 2Q of indicator clamping member 2 then stops indicator 11 so that the stopping position of member 2 in its downward movement changes according to the position of the indicator in the steps of part 2Q. Therefore, the degree of rotation of exposure time adjusting part 5 changes and the exposure time adjusting tip 5P recedes from the rotational course of the head of shutter sector 6. Then the rotating head of shutter sector 6 strikes and is kicked back by one of the steps of variable exposure time adjusting part 5Q, so that the exposure time changes according to the steps of part 5Q and takes the programmed line B–C (1/125 sec. to 1/30 sec.) as shown in FIG. 2. Then, constant adjusting part 3P of rotating indicator searching member 3 searches and touches indicator 11 and, because the degree of rotation of member 3 is constant, the degree of rotation of stop adjusting part 4 is likewise constant and the stop is kept at its full width.

Figure 4:
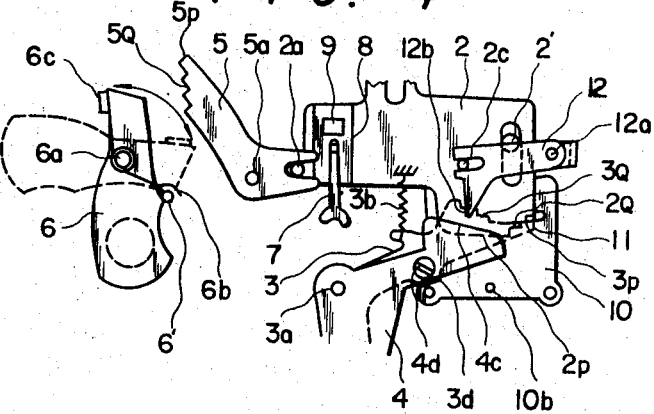
FIG. 4 is a front view which shows the positional relationship when the indicator lies in the low-brightness side within the said range.

When the subject is darkest within the automatic programming exposure range, the last step of stepped stopping part 2Q of indicator clamping member 2 touches indicator 11, as shown in FIG. 4 then the last step of stepped variable exposure adjusting part 5Q of adjusting piece 5 recedes from the rotational course of the head of shutter sector 6 which, after being kicked back not by exposure time adjusting piece but by fixed pin 6' instead, takes the longest exposure time (1/30 sec.) which also suits flash photographing, while constant adjusting part 3P of indicator searching member 3 is in contact with the indicator, so that the stop is kept at the full width.

When the subject gets still darker, the automatic programming exposure becomes impossible and the switching over to the flash photographing becomes necessary. Then, indicator 11 stays at the right corner of groove 10a and the downwardly moving indicator clamping member 2 continues its downward movement because neither the stopping part 2P nor 2Q touches indicator 11 the contact 9 then comes in contact with contact piece 7 and the flash circuit is closed. Increase in the downward movement of indicator clamping member 2 increases the rotational degree of exposure time adjusting piece 5. However, the piece 5 by then lies outside of the rotational course of shutter sector 6, so that the sector 6 is kicked back, just as before, by fixed pin 6' and the exposure time is not changed but kept at 1/30 sec. which is suitable for flash photographing. Accordingly, there is no change of exposure time in switching from an automatic programming exposure range to a flash photographing range.

Figure 5:
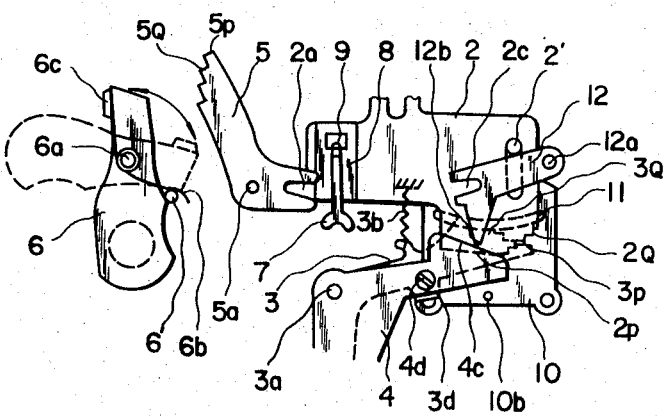
FIG. 5 is a front view which shows the positional relationship within the flash automatic exposure range of the said preferred embodiment.

As indicator 11 moves to the right corner, indicator searching member 3 continues its rotation in a counterclockwise direction because neither variable adjusting part 3Q nor constant adjusting part 3P touches the indicator (FIG. 5). However, the flash photographing adjusting lever 12 is rotated in the counterclockwise direction by downwardly moving indicator clamping member 2 and its tip 12b strikes and stops flash photographing stop adjusting cam 4c of stop adjusting piece 4 and adjusts the aperture of diaphragm 23.

Thus the flash photographing adjusting lever 12 can adjust the stop (the line C–D in FIG. 2) according to the subject's distance, since the position of pivoted axle 12a changes in accordance with the position of distance cooperation plate 13 which moves up or down according to the subject's distance (one of the conditions of flash photographing) through the distance adjusting knob 14, pin 14a and groove 13a.

Figure 6:
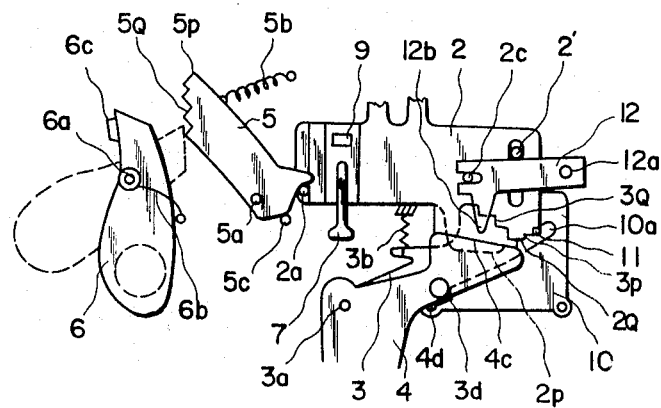
FIG. 6 is a front view which shows the arrangement of the essential parts at the time when the indicator lies in the low-brightness side of the automatic programming exposure range of another preferred embodiment.
Figure 7:
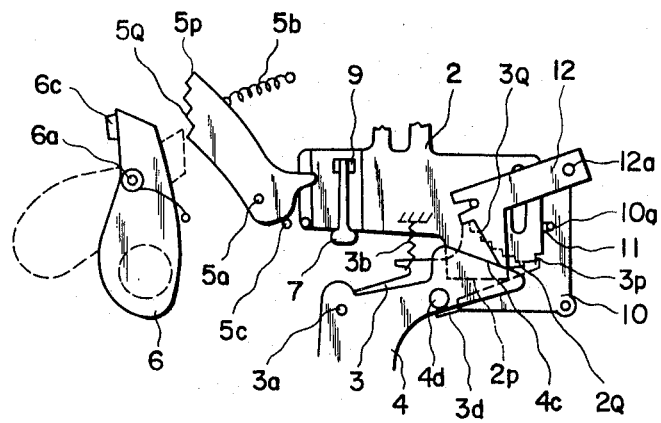
FIG. 7 is a front view of the arrangement within the flash automatic exposure range of the said second preferred embodiment.

With the second preferred embodiment shown in FIGS. 6 and 7, the last step of the stepped variable exposure time adjusting part 5Q of exposure adjusting piece 5 is made to strike and kick back the head of the shutter sector even at the lowest speed exposure time. Thus, fixed pin 6' of the first embodiment is eliminated and instead a degree deciding pin 5c for exposure adjusting piece 5 is set in order to prevent further rotation of piece 5 so that, even when indicator clamping member 2 moves further down after switching over to the flash photographing range, pin 2a and the exposure time adjusting piece 5 are made to be disconnected as is shown in FIG. 7.

With these two preferred embodiments, the subject's distance is made to be the flash condition within the flash automatic exposure range, but the stop can also be made to be adjusted in accordance with the film sensitivity or flash bulb guide number according to which the position of tip 12b of flash photographing adjusting lever 12 will then be made to be changed.

Within the automatic programming exposure range, the exposure time is first held at the highest speed and the stop is changed in accordance with the change from the high brightness to the low, from the smallest to the full width (as is shown in FIG. 2), and then the stop is held at its full width and the exposure time is changed from the highest speed to the lowest. It is of course also possible that first the stop be held at the smallest while the exposure time be changed, and then, the exposure time be held at the lowest speed while the stop be changed from the smallest to the full width. But then, the low-speed exposure will be used much of the time and it will not be desirable for ordinary cameras in general.

We claim:

1. A camera for changing over automatically to an automatic programming exposure range and to a flash automatic exposure range, comprising:
 a variable speed shutter provided with a variable diaphragm;
 a release lever for said shutter;
 an exposure meter having an indicator;
 first and second indicator-detecting members arranged for being displaced in accordance with the pressing down of said shutter release lever to detect the indicator position at its first stage of stroke;
 an adjusting lever for following said second indicator-detecting member;
 said first indicator-detecting member having a step-shaped indicator stopping portion to engage with said indicator so as to vary the degree of displacement of said first member, and further having a constant indicator stopping portion for maintaining the displacement of said first member constant, said stopping portions thereby defining an automatic programming exposure range, and said stopping portions being so disposed with respect to the stroke of said indicator as to define a flash exposure range for said first member when said pointer is out of engagement with said portions;
 said second indicator-detecting member having a flat adjusting portion to engage with said indicator so as to maintain the displacement of said second member constant when said indicator is in the automatic programming exposure range of said first member during engagement with said step-shaped indicator stopping portion, and further having a stepped adjusting portion to engage with said indicator for changing the displacement of said second member when said indicator engages with said constant indicator stopping portion, said adjusting portions thereby defining an automatic programming exposure range of said second member, and said adjusting portions being so disposed with respect to the stroke of said indicator as to define a flash exposure range for said second member when said pointer is out of engagement with said adjusting portions;
 a means for controlling the shutter speed from the speed appropriate to the flash exposure range to the highest speed in accordance with the displacement of said first indicator-detecting member when said indicator is in its automatic programming exposure range, and for holding said shutter speed for the flash photographing range when said indicator is in its flash exposure range; and
 a means for controlling said diaphragm in accordance with the displacement of said second indicator-detecting member when said indicator is in its automatic programming exposure range, and for adjusting said adjusting lever in accordance with the photographic distance to set up said diaphragm when said indicator is in its flash exposure range.

2. A camera for changing over automatically to an automatic programming exposure range and a flash automatic exposure range as claimed in claim 1, wherein the displacement of said first indicator-detecting member controls the exposure time in interlocking engagement with said adjusting lever, and the displacement of said second indicator-detecting member controls the diaphragm value in interlocking engagement with said means for controlling said adjusting lever and, in addition, said constant indicator stopping portion of said first member engages with said indicator to restrain it relative to the indicator position on a higher brightness side of the automatic programming range, and said stepped adjusting portion of said second member engages with said indicator restrained, and said step-shaped indicator stopping portion of said first member engages with said indicator to restrain it relative to the indicator position on a lower brightness side of said automatic programming range, and said flat adjusting portion of said second member engages with said indicator restrained.

3. A camera for changing over automatically to an automatic programming exposure range and a flash automatic exposure range as claimed in claim 2, wherein when said indicator position is in the lowest brightness in the automatic programming exposure range, the lowermost step of said indicator stopping portion of said first member engages with said indicator to restrain it and the tip of said flat adjusting portion of said second member engages with said indicator restrained and said adjusting lever is controlled by the longest exposure time in daylight photographing, and said means for controlling said adjusting lever controls said diaphragm for the full opening, and when said indicator turns to the lower brightness side from here said first member is further displaced to close the contact for the flash circuit without engaging with said indicator and at the same time adjust said adjusting lever for the time suitable for the flash photograph and in addition said adjusting lever adjusting means displaced by said first member and said shutter speed control means controls the diaphragm adjusting means.

* * * * *